(12) United States Patent
Chatterjee

(10) Patent No.: US 8,537,975 B2
(45) Date of Patent: *Sep. 17, 2013

(54) SYSTEM AND METHOD FOR PROVIDING A CUSTOMIZED DIALTONE

(75) Inventor: Koushik Chatterjee, Orlando, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/198,951

(22) Filed: Aug. 5, 2011

(65) Prior Publication Data

US 2011/0299665 A1    Dec. 8, 2011

Related U.S. Application Data

(63) Continuation of application No. 11/897,874, filed on Aug. 31, 2007, now Pat. No. 8,019,052.

(51) Int. Cl.
*H04M 11/00* (2006.01)

(52) U.S. Cl.
USPC ...................................... 379/67.1; 379/88.22

(58) Field of Classification Search
USPC ................... 379/67.1, 207.16, 88.22
See application file for complete search history.

(56) References Cited

U.S. PATENT DOCUMENTS

| | | |
|---|---|---|
| 6,747,970 B1 | 6/2004 | Lamb et al. |
| 8,019,052 B2 | 9/2011 | Chatterjee |
| 2003/0231749 A1 | 12/2003 | Ansley et al. |
| 2006/0093115 A1 | 5/2006 | Chen et al. |
| 2006/0101345 A1 | 5/2006 | Chen et al. |
| 2009/0060159 A1 | 3/2009 | Chatterjee |

OTHER PUBLICATIONS

U.S. Appl. No. 11/897,874; Non-Final Rejection dated Jan. 18, 2011; 5 pages.
U.S. Appl. No. 11/897,874; Notice of Allowance dated May 5, 2011; 7 pages.
U.S. Appl. No. 11/897,874; Issue Notification dated Aug. 24, 2011; 1 page.

*Primary Examiner* — Creighton Smith
(74) *Attorney, Agent, or Firm* — Swanson & Bratshun, L.L.C.

(57) ABSTRACT

A system and method for customizing communications for a communications device may include determining, at a network node, in response to determining that the communications device is in an off-hook state, that a user of the telephone has accepted to receive pre-dial content in substitution of standard pre-dial content. In response to determining that the user has accepted non-standard pre-dial content to be communicated in substitution of the standard pre-dial content, the non-standard pre-dial content may be communicated to the communications device in response to determining that the communications device is in an off-hook state. A signal from the communications device may be responded to before completion of the non-standard pre-dial content if the user pays a fee to enable interruption of the non-standard pre-dial content.

20 Claims, 4 Drawing Sheets

SYSTEM AND METHOD FOR PROVIDING A CUSTOMIZED DIALTONE

RELATED APPLICATIONS

This Application is a continuation of U.S. patent application Ser. No. 11/897,874, filed on Aug. 31, 2007 now U.S. Pat. No. 8,019,052. The entire contents of which are hereby incorporated by reference.

BACKGROUND OF THE INVENTION

In modern times, one thing that can almost always be taken for granted is that when a handset of an active land-based telephone is picked up or turned on, a dial tone is heard. For years, telecommunications network operators have been required by law to maintain a high-degree of reliability of their networks in order to maintain their licenses. Because of the high-degree of reliability, users have become accustomed to picking up the handset and hearing the familiar dial tone, which is generally formed of multiple, continuous frequencies. Despite recent developments in telecommunications, such as voice over internet protocol (VoIP) and mobile telephones, the concept of a dial tone is, nearly universally known.

While different types of telephones and different networks around the world may differ in the sound of the dial tone and method of producing the dial tone, most non-cellular networks have some version of a dial tone. Where the traditional public switched telephone network (PSTN) may receive the dial tone from a switch, such as a class 5 switch on the PSTN, the VoIP dial tone may be generated within an adaptor connected to the phone on a user's end.

FIG. 1 is an illustration of a conventional telephone communications system 100 and depicts a calling telephone 102 and a receiving telephone 104 being in communication through a network 106. The network 106 may be the PSTN.

FIG. 2 is a timing diagram of an exemplary process 200 for establishing a traditional call between a calling phone 202 and called phone 204 over a network switch 206. The calling phone 202 is shown being picked up by a user at time period 207. Time period 208 is the time that a dial tone is sent from the switch 206 to the calling phone 202. As well understood in the art, time period 207 is defined as the time between when the calling phone 202 goes "off hook" (i.e., when a user picks a handset off the receiver or turns on a cordless handset) and when a telephone call is initiated or, in the case of using a business telephone, a function key is pressed by a user. To initiate a call, the calling party may dial a telephone number of a called party. Dual-tone multiple frequency (DTMF) tones may be sent to network switch 206 at step 210. The network switch 206, in response, sends a connect signal and a ring signal 212 to the called phone 204. A ring-back signal 214 may then be sent from the network switch 206 to the calling phone 202 during the time that the signal 212 is ringing the called phone 204. In response to a user picking up the called phone 204 at time period 216, a connect signal 218a is sent from the called phone 204 to the network switch 206, which, in turn, sends connect signal 218b back to the calling phone 202, thereby completing the connection.

FIG. 3 is a timing diagram showing a conventional call initiation process 300. Shown are a calling phone 302 and network switch 304. A user may take the calling phone 302 off-hook by picking up a handset at step 306. An off-hook signal 308 is communicated from the calling phone 302 to the network switch 304. In response, the network switch 304 communicates a dial tone signal 310 back to the calling phone 302. The dial tone signal is generally continuously sent until a user initiates a call by pressing a keypad button or other call or function initiation mechanism or until a predetermined time has elapsed, where upon the dial tone is substituted with an off-hook tone. A DTMF signal 312 is thereafter communicated to the network switch 304 from the calling phone 302 and the dial tone signal is terminated.

SUMMARY OF THE INVENTION

Rather than communicating a conventional dial tone signal, the principles of the present invention provide for a customized dial tone or pre-dial content. The pre-dial content may be any form of audio content. For example, the pre-dial content may include music, news, entertainment, or any other audio content. The pre-dial content may be communicated to a calling phone in the form of a message or continuous streaming signal. A network switch or other network node, such as an adapter in the case of using a VOIP phone, may be configured to enable a user to select content type or particular content to replace or otherwise substitute a conventional dial tone.

One embodiment of a method for customizing communications for a communications device may include determining, at a network node, in response to determining that the communications device is in an off-hook state, that a user of the telephone has accepted to receive non-standard pre-dial content in substitution of standard pre-dial content. In response to determining that the user has accepted non-standard pre-dial content to be communicated in substitution of the standard pre-dial content, the non-standard pre-dial content may be communicated to the communications device in response to determining that the communications device is in an off-hook state. A signal from the communications device may be responded to before completion of the non-standard pre-dial content if the user pays a fee to enable interruption of the non-standard pre-dial content.

One embodiment of a system for customizing communications for a communications device may include a network node configured to determine, in response to determining that the communications device is in an off-hook state, that a user of the telephone has accepted to receive non-standard pre-dial content in substitution of standard pre-dial content. The network node may further be configured to determine that the user has accepted the non-standard pre-dial content to be communicated in substitution of the standard pre-dial content to the communications device in response to determining that the communications device is in an off-hook state, and to respond to a signal from the communications device before completion of the non-standard pre-dial content if the user pays a fee to enable interruption of the non-standard pre-dial content.

BRIEF DESCRIPTION OF THE DRAWINGS

The principles of the present invention is described in detail below with reference to the attached figures, wherein.

DETAILED DESCRIPTION OF THE INVENTION

The principles of the present invention provide for a system and method for pre-dial content delivery to a telephone and a system and method for dial tone replacement. A telephone can include any form of communication device over any communication protocol that provides a dial tone to notify a user that the communication is off-hook and operating. The description that follows is directed to one or more embodiments, and should not be construed as limiting in nature. In one embodiment, a network node, such as a network switch, may replace a dial tone communicated to a telephone with pre-dial content capable of being presented to a calling party by the calling phone.

Figure 1:
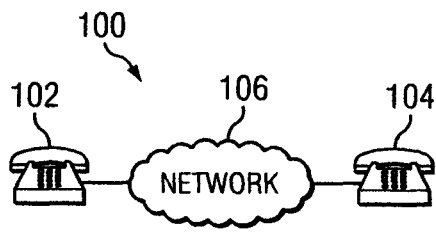
FIG. 1 is an illustration of a conventional telephone system.
Figure 2:
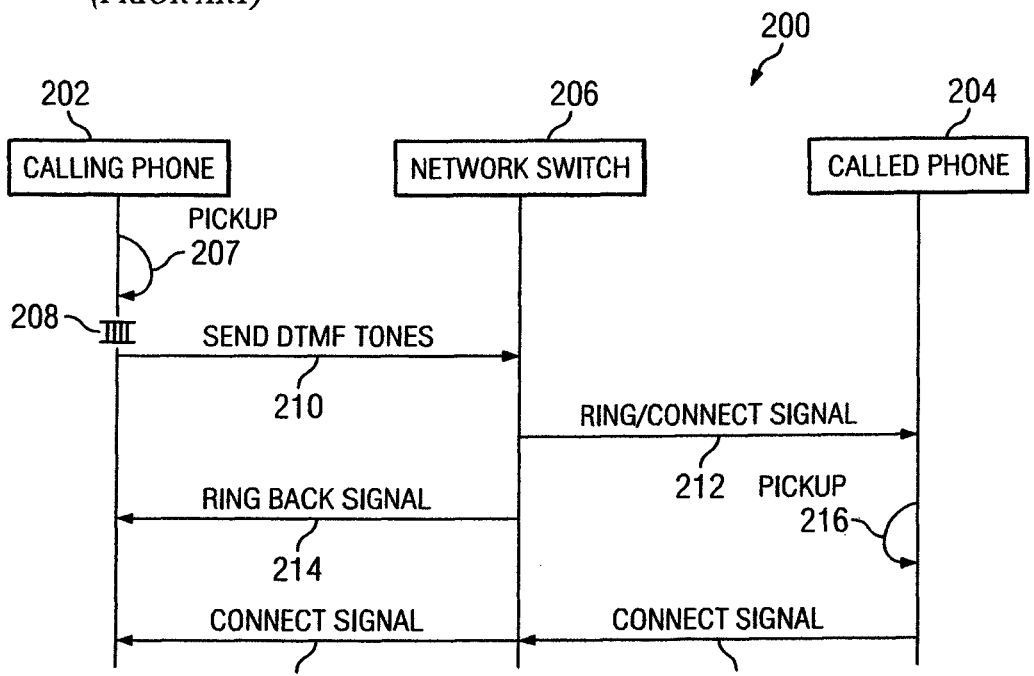
FIG. 2 is a timing diagram of an exemplary process for establishing a traditional call between a calling phone and a called phone over a network switch.
Figure 3:
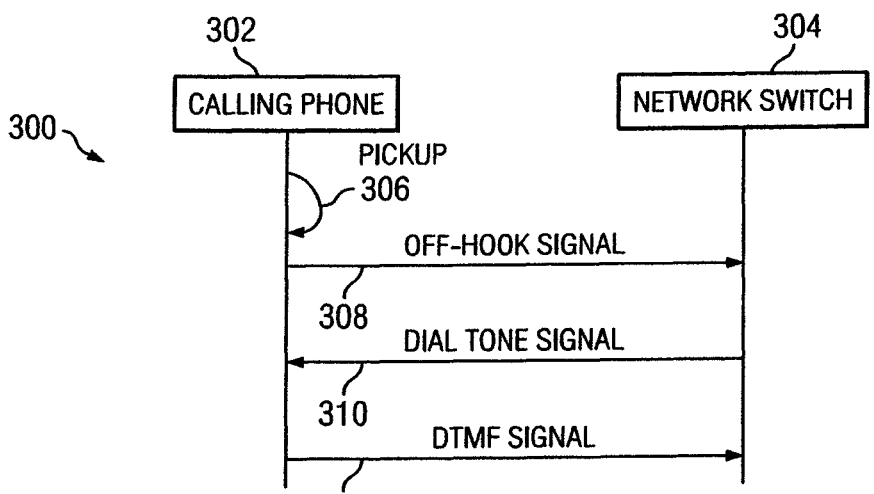
FIG. 3 is a timing diagram showing a conventional call initiation process for establishing a call.
Figure 4:
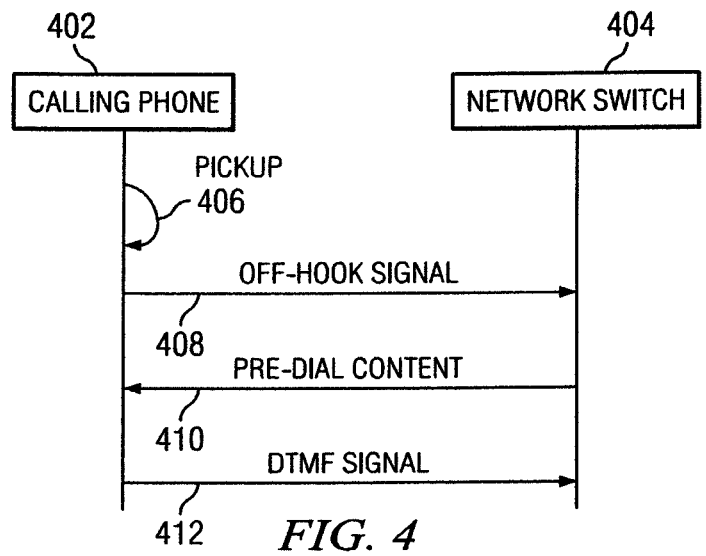
FIG. 4 is a timing diagram of an exemplary pre-call initiation process for establishing a call in accordance with the principles of the present invention.

In an exemplary embodiment, as depicted in FIG. 4, a calling phone 402 is used to call a called phone (not shown) via a network switch 404. In response to the calling phone 402 being picked up at step 406 by a user picking up a handset from a receiver, or in the case of a cordless phone being turned on, an off-hook signal 408 may be generated from the calling phone 402 and sent to the network switch 406. The network switch 406 receives the off-hook signal 408 and determines, based on a set of rules (described below in FIG. 5), what type of pre-dial content 410 should be delivered to the calling phone 402. The pre-dial content 410 is delivered to the calling phone 402 in response to receipt of the off-hook signal 408 by the network switch 404 and prior to initiation of a call, where initiation of a call uses a DTMF signal 412 to be communicated from the calling phone 402 to the network switch 404.

The pre-dial content 410, in the case of a traditional "land line" telephone, can include an almost unlimited variety of audio content. The pre-dial content 410 may be time dependent or non-time dependent. Time dependent pre-dial content is content that varies over the course of a day, week, month, or year. Examples of time dependent content include news, weather, traffic, sports scores, stock quotes, horoscopes, emergency alerts, or any other information or content that may vary over time. Non-time dependent content is content that does not vary over the course of time. Examples of non-time dependent content include celebrity greetings, personal greetings, music, jokes, fortunes, service provider jingles, and advertisements. These pre-dial content 410 examples are not intended to limit the full scope of possibilities of types of content that may be used to replace or otherwise substitute a conventional dial tone.

In communicating the pre-dial content 410 to the calling phone, the duration of the pre-dial content 410 may be determined based on the type of pre-dial content 410 or any number of different rules that may be executed by the network switch 404. For example, if the pre-dial content 410 to be presented to the user is a single message, such as a 10-second joke, the time period of the pre-dial content 410 would be for the duration of the joke. If the pre-dial content 410 includes stock quotes, or any other type of information that may be streamed, a rule can be established to stream the pre-dial content 410 for a set length of time, such as a length of time of a conventional dial tone, where an off-hook tone, as understood in the art, may replace the pre-dial content 410 when held off-hook too long.

As presented in FIG. 4, there is a distinct window in which the pre-dial content 410 is to be communicated to the calling phone 402. Specifically, the pre-dial content 410 may be communicated to the calling phone 410 and presented to a user from the time the calling phone 402 goes off-hook until the time that a user initiates a call sequence, such as by entering a digit of a telephone number on the calling phone 402. This time correlates to the time when a conventional dial tone is presented to the user. In an alternative embodiment, the pre-dial content 410 may continue to be presented until a pre-determined time period has expired or a per-determined rule has been satisfied. In this embodiment, a user may enter a telephone number while the pre-dial content is being presented to the user and, in response to the pre-dial content being completed, communicate the telephone number to the network switch 404. This embodiment allows for pre-dial content to be completely presented to the user. Such an embodiment may be beneficial to an advertiser to ensure that the user hears an entire advertisement, rather than the user initiating a call sequence and not listening to the advertisement. In yet another embodiment, a user having to place an emergency call, such as calling 911, may be allowed to place a call without having to wait for the entire advertisement to play. The emergency override may be encapsulated as a rule that ends the pre-dial content upon recognition that an emergency number has been entered. In one embodiment, the calling phone 402 may include a buffer (not shown) to buffer a single message or data stream to minimize disruption or delay of the pre-dial content being communicated over a network.

Figure 5:
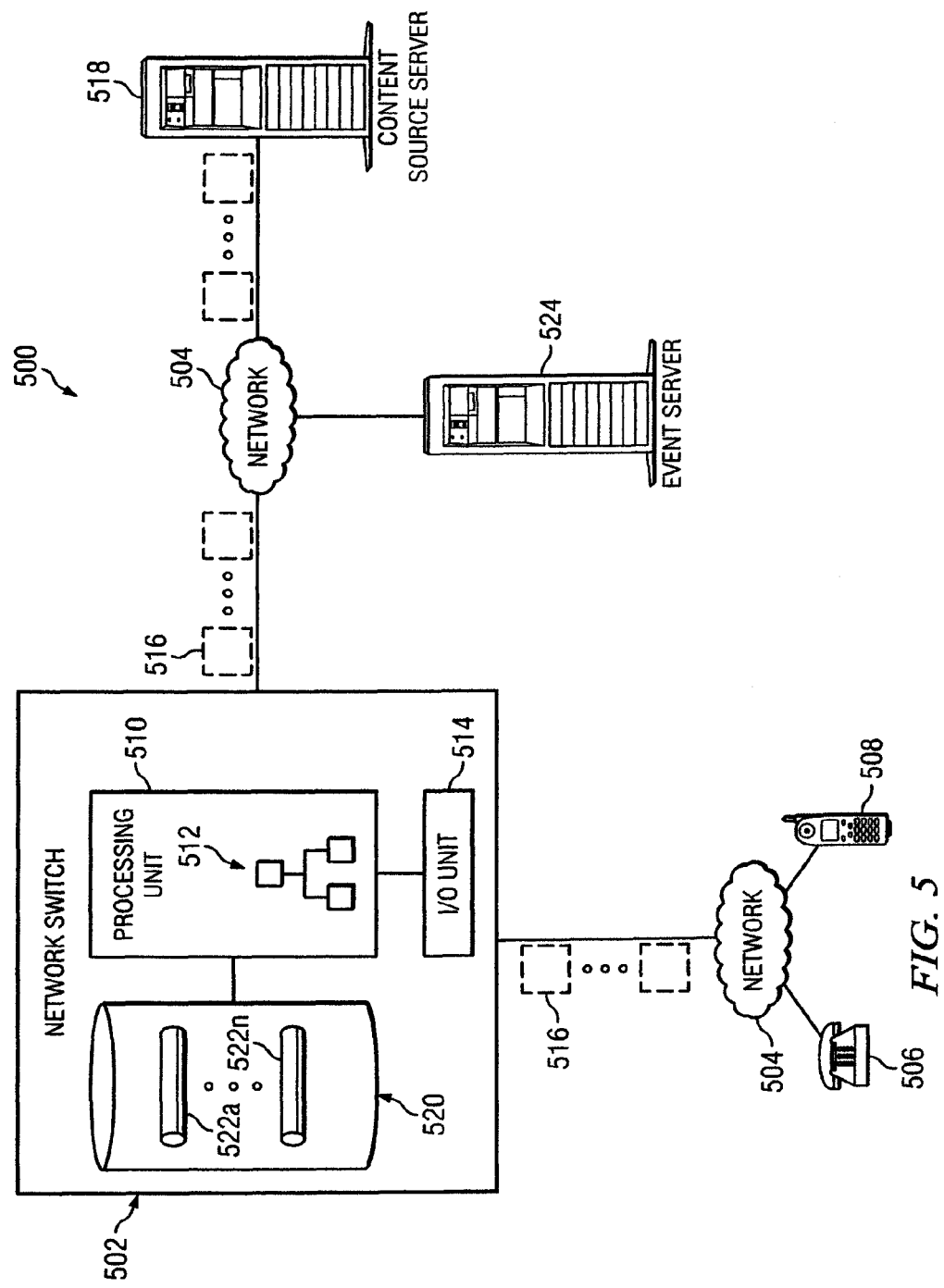
FIG. 5 is an illustration of an exemplary system diagram for providing pre-call content for communication to a calling phone during a pre-call initiation process.

FIG. 5 is an illustration of an exemplary system 500 for providing pre-dial content for communication to a calling phone. The system 500 includes a network switch 502 that is in communication with a network 504. The network 504 is shown to be formed of multiple sections, but may be otherwise illustrated as a single network. The network 504 may be a PSTN, Internet, or other network configured to provide telecommunications. The network switch 502 may be configured to provide calling services between a calling phone 506 and a called phone 508 that may be on the same or different networks, as understood in the art.

The network switch 502 may include a processing unit 510 that executes software 512. The software 512 may be configured to handle communications from any phone operating on the network 504 for processing calls with other telephones on the network 504. In addition, the software 512 may be configured to generate a conventional dial tone for telephones on the network 504 placing a call. For example, if calling phone 506 calls called phone 508, the software 512 may generate a dial tone that is communicated to the calling phone 506 prior to a user initiating a call by pressing a number on a keypad (not shown) on the calling phone 506. Additionally, the software 512 can include a set of rules that relate to the dial tone or substituted pre-dial content. One example is a rule that would prevent a DTMF signal from being responded to until the completion of the pre-dial content message, the completion of a set time duration, or the entry of an emergency number. In other words, if such a rule were to be utilized, even if the telephone user enters in a number, the processing unit will not respond to the DTMF signal until the rule has been satisfied. Another rule may cause the pre-dial content to stop or interrupt playing in response to receiving a DTMF signal and the user pays a fee for pre-dial content to be stopped before completion.

The processing unit 510 may be in communication with an input/output (I/O) unit 514 that may be configured to communicate signals 516 over the network 504. To communicate with communications devices and other network nodes, such as content source server 518, in communication with the network 504. The processing unit 510 may further be in communication with a storage unit 520 that may include one or more repositories 522a-522n (collectively, 522), such as audio databases, that may be used for storing audio files that are used to substitute conventional dial tones in accordance with the principles of the present invention.

The software 512 may further be configured to enable a user of a phone, such as calling phone 506, to selectively enable one or more types of pre-dial content to be communicated to the calling phone 506 prior to initiating a call. The function of enabling a user to select pre-dial content is further described herein with regard to FIG. 8. The I/O unit 514 may include a variety of types of hardware and software that are capable of communicating a single audio signal or message for non-time dependent content or streaming audio for time dependent content that is being delivered to the network switch 502 from the content source server 518. More specifically, for time dependent content, the content source server 518 may be configured to store pre-dial content and communicate the pre-dial content in a data stream, such that the audio information being streamed from the content source server 518 is substantially real time or time delayed, but "up to the minute." Alternatively, time dependent content, such as stock prices, weather reports, traffic reports or other information that is generally updated on a real time or up-to-the-minute basis may be generated and/or streamed by the content source server 518 to the network switch 502 for storage in the repositories 522 or routing to calling phones, such as calling phone 506.

In one embodiment, an event server 524 may also be connected to the network 504 to provide instructions to the processing unit 510 regarding the pre-dial content. The event server 524 may be a network device that watches for a user defined event, and if a user defined event occurs, sends a message to the processing unit 512 to change the pre-dial content to be communicated and presented. An example of this would be for the event server to recognize a stock quote has reached a set price and to change the pre-dial content to present that quote or that the stock exceeded the target price the next time the off-hook signal is received. It should be understood that the event server 524 may be configured to enable users to select from or otherwise define many different types of events to track and report in pre-dial content. A voice or web portal may be utilized to enable the user to interface and set a user defined event.

Figure 6:
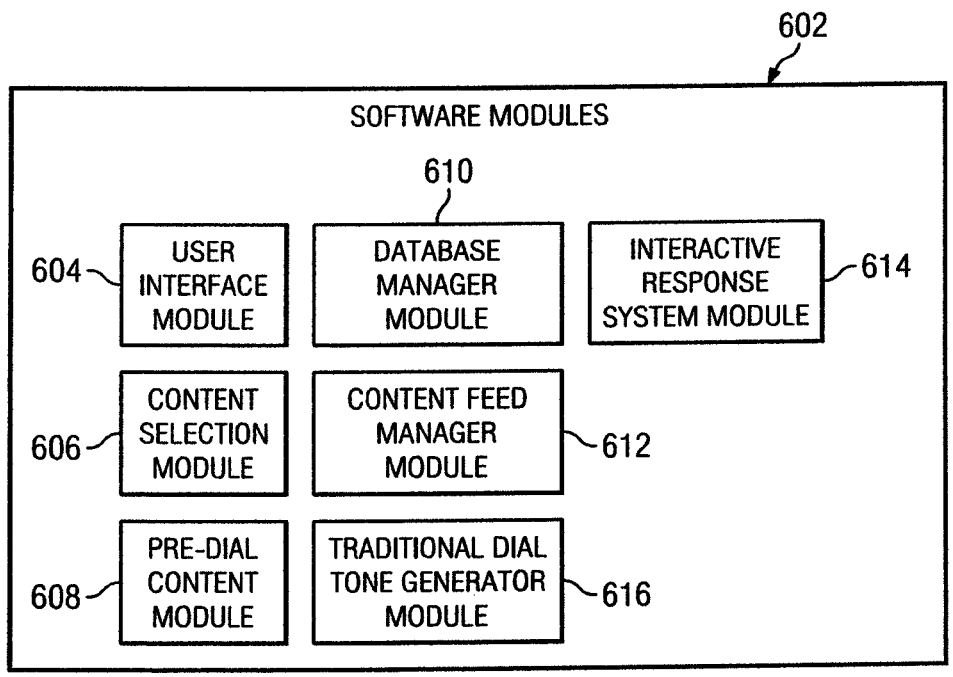
FIG. 6 is an illustration of exemplary software modules executed by a processing unit of a network switch.

FIG. 6 is an illustration of an exemplary software modules 602 that may be part of the software 512 (FIG. 5) for performing functions in accordance with the principles of the present invention. The software modules 602 may include a user interface module 604, content selection module 606, pre-dial content module 608, database manager module 610, content feed manager module 612, interactive response system module 614, and traditional dial tone generated module 616. The software module 602 may include other software modules, fewer software modules, or software modules in combination depending upon the functionality of the network switch 502 (FIG. 5).

The user interface module 604 may be configured to enable a user to access or otherwise establish preferences for the type of pre-dial content to be delivered. The user interface module 604 may operate in conjunction with the interactive response system module 614 that provides either or both voice and DTMF interactive response operations. Alternatively, the user interface module 644 may enable the user to interface with the software module 602 via an online interface, such as a website. In one embodiment, the user interface module 604 may be accessed by a user by the user calling the network switch 502 using a telephone number that is dedicated to enable the user to interface with the network switch 502. The user interface module 604 may also utilize the functionality of the content selection module 606 that may enable the user to select the pre-dial content to be communicated to the calling phone of the user in substitution of a conventional dial tone.

Alternatively, rather than the user selecting the pre-dial content, the service provider or other operator may select the pre-dial content to be communicated to a user. For example, rather than allowing the user to select streaming stock quotes when the calling phone is off-hook, advertisement content may be provided by the service provider for presentation to the user during a conventional dial tone time period. In one embodiment, the user may select an option to allow advertisements to replace the conventional dial tone in exchange for a discounted phone rate, reward, or any other benefit to the user. In one embodiment, the user may be provided with the pre-dial content for free or be required to pay a monthly service charge, for example, to have access to the pre-dial content. In one embodiment, certain pre-dial content may be more expensive than other pre-dial content. For example, stock quotes that are real time or up-to-the-minute may be more expensive than delayed stock quotes.

The pre-dial content module 608 may be configured to generate a conventional dial tone and access and broadcast or otherwise communicate pre-dial content to a calling phone. The dial tone and pre-dial content module may be configured to communicate with the databases 522 (FIG. 5) and/or I/O unit 514 to access and communicate a conventional dial tone or pre-dial content. The pre-dial content module 608 may be in communication with each of the other modules to provide for general management of operation for providing pre-dial content to users on the network 504.

The database manager module 610 may be configured to manage pre-dial content, such as audio files, stored in a data repository or database. The database manager module 610 may be configured to update, delete, add, or otherwise manage the pre-dial content stored in the database.

The content feed manager module 612 may be configured to manage pre-dial content that is being streamed or otherwise fed to the network switch 502 (FIG. 5) and that is generally time dependent content. The content feed manager module 612 may be configured to communicate with the content source server 518 or any other content source of pre-dial content that is being streamed or otherwise communicated via the network 504 to the network switch 502.

The traditional dial tone-generator module 616 may be configured to generate a conventional dial tone. This enables the network switch 502 to be compatible with legacy systems or otherwise provide conventional dial tones to those users who do not desire to receive pre-dial content.

Figure 7:
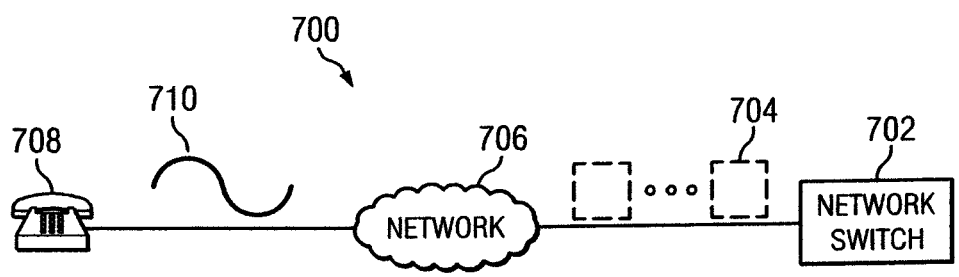
FIG. 7 is a depiction of a network switch communicating pre-dial content to a calling phone prior to a call initiation process.

FIG. 7 is a depiction of a system 700 that includes a network switch 702 communicating pre-dial content 704 via a network 706 to a calling phone 708. The network switch 702 may communicate single messages (i.e., an audio signal that is long enough to cover a length of time of a conventional dial tone), where the single message may be the start of a song, single joke, or any other message that is not time dependent. The network switch 702 may further be configured to communicate streaming content that is time dependent. In general, the non-time dependent content may be sent to the calling phone 708 and have the same starting point each time sent (e.g., start of an advertisement or joke), whereas the time dependent content may be streamed from a current time of the content (e.g., current stream of news broadcast). It should be understood that time dependent and non-time dependent content may be mixed such that, for example, advertisements may be played during a newscast. As shown, if the calling phone 708 is a conventional analog phone connected to the PSTN, then an analog signal 710 may be communicated to the calling phone 708. Alternatively, if the calling phone 708 is a digital phone or packet phone compatible phone, then digital or package signals may be communicated to the calling phone 708 containing time dependent or non-time dependent content.

Figure 8:
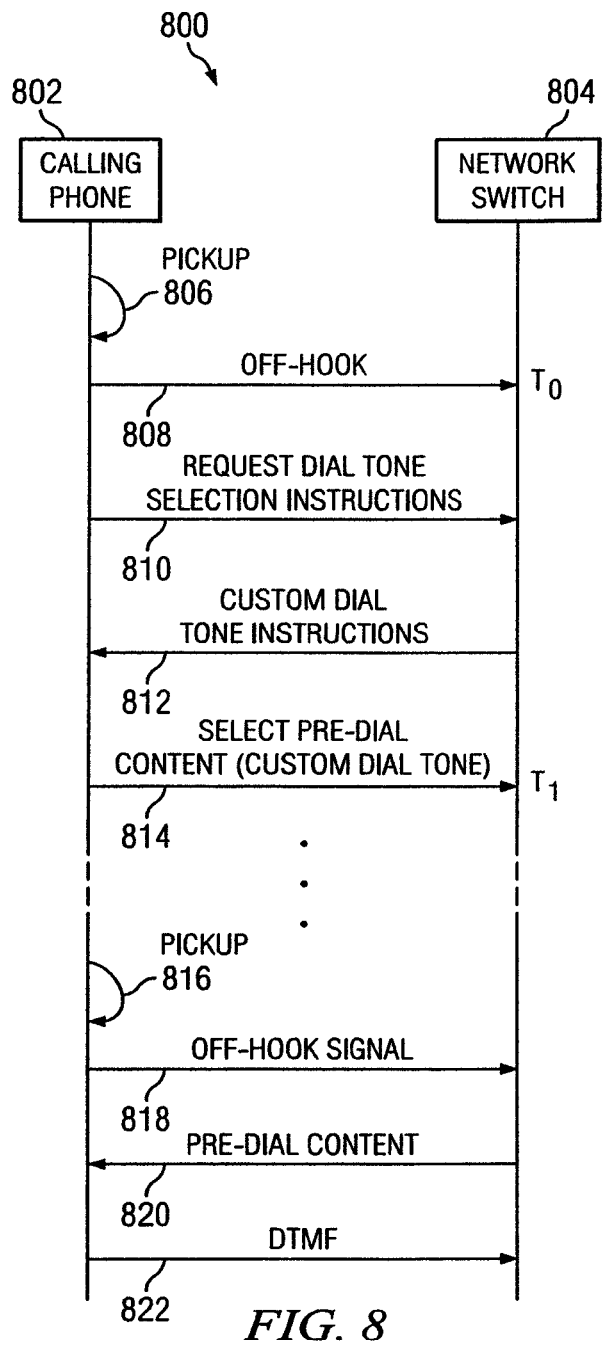
FIG. 8 is a timing diagram of an exemplary process for setting up preferences for receiving pre-call content.

FIG. 8 is a timing diagram of an exemplary process 800 for setting up preferences for receiving pre-call content. At step 806, a user may pick-up or otherwise activate the calling phone 802. At step 808, an off-hook signal may be communicated to the network switch 804 at time $T_0$. At step 810, a request for dial tone selection instructions may be communicated to the network switch 804 via a voice interactive response menu, for example. At step 812, custom dial tone instructions may be communicated from the network switch 804 to the calling phone 802, where a user operating the calling phone 802 may select pre-dial content or a custom dial tone and communicate the selection to the network switch 804 using voice response or DTMF signals at step 814. The pre-dial content selection may be completed at time $T_1$. From time $T_1$ going forward, the network switch 804 may be configured to substitute or replace the conventional dial tone with the selected pre-dial content.

Continuing with FIG. 8 at step 816, the user may pick-up the calling phone 802 and an off-hook signal may be communicated from the calling phone 802 to the network switch 804 at step 818. At step 820, pre-dial content is communicated from the network switch 804 to the calling phone 802 as a substitution of a conventional dial tone. At step 822, the user operating the calling phone 802 may initiate a call sequence by pressing a number key on a keypad of the calling phone 802, which causes a DTMF signal to be communicated from the calling phone 802 to the network switch 804. It should be understood that several different procedures for enabling the user to initiate the call sequence prior to completion of the pre-dial content or completion of the pre-dial content before communicating the DTMF signal from the calling phone 802 to the network switch 804 may be utilized in accordance with the principles of the present invention.

In an alternative embodiment, rather than the user having to use the calling phone 802 to set up or otherwise select pre-dial content from the network switch 804, the principles of the present invention may provide for a web page or other mode of selecting pre-dial content to be substituted in place of a conventional dial tone. In one embodiment, the user may call a customer representative to select the pre-dial content. It should be understood that the principles of the present invention are not reliant upon the particular mechanism for setting up or otherwise selecting per-dial content to be communicated to a calling phone. Furthermore, rather than using a network switch 804, the principles of the present invention may allow for any network node, such as a network adapter or server, to be utilized to perform the same or analogous functionality in conjunction with or in replacement of the network switch 804. For example, a server or other computing device may be utilized to communicate pre-dial content to be substituted in place of a conventional dial tone.

Figure 9:
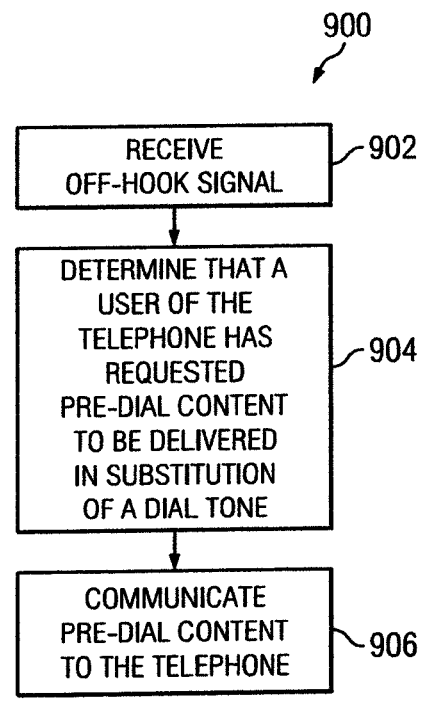
FIG. 9 is a flow chart of an exemplary process for communicating pre-dial content to a calling phone in accordance with the principles of the present invention.

FIG. 9 is a flow chart of an exemplary process 900 for communicating pre-dial content to a calling phone. In this embodiment, a network switch receives an off-hook signal from the calling phone 902 and determines that a user of the telephone has requested pre-dial content to be communicated to the telephone in substitution of a dial tone 904. In response to the determination that a user has requested pre-dial content to be communicated in substitution of a dial tone that was made upon receiving the off-hook signal from the telephone, the network switch may communicate the pre-dial content to the telephone 906. The pre-dial content may be an audio signal including time dependent and/or non-time dependent content as previously described.

The previous description is of at least one embodiment for implementing the invention, and the scope of the invention should not necessarily be limited by this description. The scope of the present invention is instead defined by the following claims.

What is claimed is:

1. A method for customizing communications for a communications device, said method comprising:
   determining, at a network node, in response to determining that the communications device is in an off-hook state, that a user of the telephone has accepted to receive non-standard pre-dial content in substitution of standard pre-dial content;
   in response to determining that the user has accepted non-standard pre-dial content to be communicated in substitution of the standard pre-dial content, communicating the non-standard pre-dial content to the communications device in response to determining that the communications device is in an off-hook state; and
   responding to a signal from the communications device before completion of the non-standard pre-dial content if the user pays a fee to enable interruption of the non-standard pre-dial content.

2. The method according to claim 1, wherein determining that the communications device is in an off-hook state includes receiving an off-hook signal from the communications device.

3. The method according to claim 1, wherein the communications device is a telephone.

4. The method according to claim 1, wherein the standard pre-dial content is a dial tone.

5. The method according to claim 1, wherein the responding to a signal includes responding to a dual-tone multiple frequency (DTMF) signal.

6. The method according to claim 1, wherein communicating the non-standard pre-dial content includes communicating time dependent content.

7. The method according to claim 6, wherein communicating the pre-dial content includes communicating content selected based on a user defined event occurring.

8. The method according to claim 1, wherein communicating the non-standard pre-dial content includes communicating audio content.

9. The method according to claim 1, further comprising selecting, by a service provider, a type of non-standard pre-dial content to be delivered.

10. The method according to claim 1, further comprising preventing a DTMF signal from being responded to until completion of one of a discrete content message, a set time duration, or entry of an emergency number.

11. A system for customizing communications for a communications device, said system comprising:
a network node configured to:
determine, in response to determining that the communications device is in an off-hook state, that a user of the telephone has accepted to receive non-standard pre-dial content in substitution of standard pre-dial content;
determine that the user has accepted the non-standard pre-dial content to be communicated in substitution of the standard pre-dial content to the communications device in response to determining that the communications device is in an off-hook state; and
respond to a signal from the communications device before completion of the non-standard pre-dial content if the user pays a fee to enable interruption of the non-standard pre-dial content.

12. The system according to claim 11, wherein said network node is further configured to determine that the communications device is in an off-hook state by determining whether an off-hook signal is received from the communications device.

13. The system according to claim 11, wherein the communications device is a telephone.

14. The system according to claim 11, wherein the standard pre-dial content is a dial tone.

15. The system according to claim 11, wherein the signal is a dual-tone multiple frequency (DTMF) signal.

16. The system according to claim 11, wherein the non-standard pre-dial content is time dependent, audio content.

17. The system according to claim 11, wherein the network node includes a database configured to store the non-standard pre-dial content, the non-standard pre-dial content including non-time dependent content.

18. The system according to claim 11, wherein the non-standard pre-dial content includes content selected based upon a user defined event occurring.

19. The system according to claim 11, wherein said network node is further configured to prevent a DTMF signal from being responded to until completion of one of a discrete content message, a set time duration, or entry of an emergency number.

20. The system according to claim 11, further comprising an input/output unit for enabling a user of the communications device to select a type of non-standard pre-dial content to be communicated.

* * * * *